United States Patent Office

3,143,464
Patented Aug. 4, 1964

3,143,464
METHOD OF STERILIZATION
Charles Riffkin, Highland Park, and David Marcus, East Brunswick, N.J., assignors to Olin Mathieson Chemical Corporation, New York, N.Y., a corporation of Virginia
No Drawing. Filed July 11, 1962, Ser. No. 209,237
5 Claims. (Cl. 167—58)

This invention relates to a method of sterilization. More particularly, the invention relates to a method of sterilizing aqueous compositions in situ, especially drug preparations.

Many compositions requiring sterilization are sensitive to heat and cannot be made sterile by this conventional method. The addition of chemical sterilizing agents introduces the problem of objectionable residual material remaining after the sterilizing agent has completed its function. Some sterilizing agents are irritating, toxic or dangerous to handle. It has now been found that aqueous compositions may be sterilized through the action of a material which is effective, convenient and relatively safe to handle, and leaves no dangerous or undesirable residue.

According to this invention, aqueous compositions, and aqueous drug preparations in particular, contaminated by the presence of microorganisms, especially bacteria of the genera Salmonella, Bacillus, Streptococcus and Staphylococcus and fungi of the genera Fusarium, Aspergillus and Penicillium may be made sterile by incorporating in the aqueous composition 2,3-epoxy-1-propanol and maintaining the mixture sealed from further outside contamination for a period sufficient for the additive to render it sterile.

The 2,3-epoxypropanol is a water-white liquid boiling at 160° C. It is relatively safe and easy to handle and in aqueous systems it is hydrolyzed to the innocuous glycerin as sterilization occurs. Glycerin, in addition to being biologically acceptable, exerts a desirable humectant and plasticizing action on the product. No special sterility precautions are necessary during handling and manufacture of the product, resulting in an economic advantage.

We have now discovered that 2,3-epoxypropanol in concentrations of about 0.1% to 5% (based on the total weight of the product), preferably 0.5 to 1%, when mixed with aqueous systems and sealed from further outside contamination, will effectively sterilize the contents within a period of about one week. The time required for hydrolysis to glycerin is in general dependent on the pH of the system and the temperature at which it is stored. The sterilizing action of 2,3-epoxypropanol is effective over a broad pH range, e.g., about 1.0 to about 10.0. It is also effective over a broad temperature range above and below room temperature. In general, hydrolysis occurs more quickly at a low pH and at elevated temperatures and is slower at a high pH and low temperatures. These considerations are, as a practical matter, usually of no particular moment since after sealing sterilization is effected at ambient temperature during the time the product is in the normal storage or distribution channels.

It is thus possible to sterilize aqueous solutions, aqueous suspensions, jellies, lotions, creams, oil in water emulsions, aerosols, etc. Similarly, preparations in which such compositions serve as vehicles for medicaments and other biologically useful substances, may also be rendered sterile by the method of this invention since the 2,3-epoxypropanol is compatible with a wide variety of such substances.

Illustrative of such compositions are aqueous solutions such as syrups, elixirs, and the like, aqueous suspensions, aqueous jellies made from sodium carboxymethyl cellulose, guar gum, methyl cellulose, hydroxyethyl cellulose, carbopol, polyvinyl pyrrolidone, tragacanth, sodium alginate, acacia, and the like; aqueous lotions made from glyceryl monostearate, diglycol stearate, spermaceti, stearyl alcohol, or clear lotions made from quaternary compounds such as benzalkonium chloride, cetyl pyridinium chloride and the like; aqueous creams made from stearic acid, emulsified with nonionic surfactants such as Spans and/or Tweens, or emulsified with anionic surfactants such as Aerosol OT sodium lauryl sulfate and the like; oil in water emulsions made from corn oil, safflower oil, olive oil, mineral oil, peanut oil, cottonseed oil and the like, etc.

Medicaments which may be incorporated in aqueous compositions such as those illustrated above include for example, one or more of the following: adrenergic agents such as ephedrine, desoxyephedrine, phenylephrine, epinephrine and the like, cholinergic agents such as physostigmine, neostigmine and the like, antispasmodic agents such as atropine, methantheline, papaverine and the like, curariform agents such as chlorisondamine and the like, tranquilizers and muscle relaxants such as fluphenazine, chlorpromazine, triflupromazine, mephenesin, meprobamate and the like, antihistamines such as diphenhydramine, dimenhydrinate, tripelennamine, perphenazine, chlorprophenazine, chlorprophenpyridamine and the like, hypotensive agents such as rauwolfia, reserpine and the like, cardioactive agents such as benzydroflumethiazide, flumethiazide, chlorothiazide, aminotrate and the like, steroids such as testosterone, fludrocortisone, triamcinolone, cortisone, prednisolone and the like, antibacterial agents, e.g., sulfonamides such as sulfadiazine, sulfamerazine, sulfamethazine, sulfisoxazole and the like, antimalarials such as chloroquine and the like, antibiotics such as the tetracyclines, nystatin, streptomycin, penicillin, griseofulvin and the like, sedatives such as chloral hydrate, phenobarbital and other barbiturates, glutethimide, antitubercular agents such as isoniazid and the like, analgesics such as aspirin, meperidine and the like, insulin and other polypeptides, vitamins and enzymes, blood products and the like.

Other materials such as stabilizing agents, surface active materials, coloring and flavoring agents and other ancillary agents as required or desirable may also be included in the aqueous compositions.

The aqueous composition may be prepared in the conventional manner and the medicament or other active ingredient included therein. The 2,3-epoxypropanol is then added in the proportion indicated previously and thoroughly admixed with the aqueous composition until dissolved or thoroughly dispersed throughout the composition. The 2,3-epoxypropanol may be added in undiluted form or as a concentrated aqueous solution. The product is filled or packaged in the container in which it will be distributed, e.g., bottle, tube, aerosol container, vial or the like. The package is then sealed to preclude the entry of additional contaminants.

The following examples are illustrative of the invention.

*Example 1*

Two kg. of an aqueous jelly was prepared with 2% sodium carboxymethylcellulose, high viscosity, containing 0.3% sodium biphosphate to produce a pH of 4.8. Two levels of *B. subtilis* on calcium carbonate, 100 organisms/gm. and 40,000 organisms/gm. were used to contaminate the jelly. One-half was separated and used as the control, and to the other half two separate levels of 2,3-epoxypropanol were added in concentraitons of 0.5% and 1%, respectively. The jellies were then filled into standard one-half ounce tin ointment tubes, sealed and stored at room temperature (25° C.) for two weeks and then submitted for sterility test. One gram was extruded from each of ten tubes into 75 ml. sterile thioglycollate medium. The results were as follows:

| Controls | | 2,3-epoxypropanol conc. | | | |
|---|---|---|---|---|---|
| | | 0.5% | | 1.0% | |
| LC[1] | HC[2] | LC | HC | LC | HC |
| 10/10 | 10/10 | 0/10 | 0/10 | 0/10 | 0/10 |

[1] LC—Low concentration of inoculum (100 organism/gram).
[2] HC—High concentration of inoculum (40,000 organisms/gram).

It is apparent that all of the controls were contaminated while the tubes containing 0.5% as well as 1% of 2,3-epoxypropanol produced sterile jellies, with no contamination.

Example 2

1 liter of an aqueous solution of streptomycin sulfate equivalent to 400 mg./ml. of streptomycin activity was stabilized with 20 mg./ml. of sodium citrate and 5 mg./ml. of sodium bisulfite. The solution was then contaminated with 1 cc./liter of a culture of mixed organisms (containing species of Saccharomyces, Aspergillus, Penicillium, Fusarium, Cladosporium, Bacillus, Escherichia, Staphylococcus, Streptococcus, Pseudomonas and Alternaria) and then divided into two parts. One 200 ml. portion remained as the control and to 800 ml. 2,3-epoxypropanol (1%) was added. Both solutions were filled at a level of 10 cc. into 20 cc. vials, without regard for sterility precautions. The vials were then sealed and capped and stored at room temperature (25° C.) for three weeks. At the end of that time period, the control vials exhibited heavy growth of organisms while the vials containing the 2,3-epoxypropanol were still brilliantly clear. A sterility test showed that the control vials were contaminated with gram positive and gram negative micro-organisms, while the test vials were sterile. Chemical assay of the streptomycin content failed to disclose any change in potency in either the control vials or the treated vials.

Example 3

An aqueous lotion was prepared of the following composition (pH 5.3).

| | Grams |
|---|---|
| Cetyl alcohol | 3.0 |
| Stearyl alcohol | 0.2 |
| Tween 20 | 2.2 |
| Span 40 | 0.5 |
| Propylene glycol | 4.5 |
| Methylparaben | 0.2 |
| Propylparaben | 0.02 |
| Distilled H₂O, q.s. 100 cc. | |

1800 gm. of the above lotion was inoculated with a suspension of B. subtilis so that it contained approximately 10,000 organisms/ml. The lotion was then divided; 800 gm. was kept as a control and to 1 kg. 10 ml. of 2,3-epoxypropanol (1%) was added. After standing at room temperature (25° C.) for two weeks, both lotions were tested for sterility in the usual manner. The control showed the B. subtilis contamination, while the test lotion containing the 2,3-epoxypropanol was sterile.

Example 4

An aqueous suspension of procaine penicillin was prepared of the following composition (pH 6.8):

| | | |
|---|---|---|
| Procaine penicillin | units per ml | 500,000 |
| Lecithin | gm | 10.0 |
| Sodium citrate | gm | 10.0 |
| Methylparaben | gm | 1.3 |
| Propylparaben | gm | 0.2 |
| Water for injection, q.s. 1 liter. | | |

Two liters of the above suspension were inoculated with 1.7 ml. of a culture of mixed organisms described in Example 2 (in addition, the penicillin resistant Cahill strain of S. aureus was added). The suspension was then divided in half and one-half was kept as a control. To the remaining liter 10 ml. of 2,3-epoxypropanol (1%) was added. The preparations were stored for three weeks at room temperature (25° C.) and tested for sterility in the usual manner. Sterility tests showed the control to be contaminated with gram positive microorganisms while the test vials were sterile. Chemical assay of the penicillin content failed to indicate any change in potency in either the control or the treated vials.

What is claimed is:
1. A method for cold sterilizing aqueous injectable pharmaceutical compositions in situ which comprises incorporating 2,3-epoxypropanol in the composition and maintaining the composition sealed from further outside contamination until sterile.
2. A method as in claim 1 wherein the concentration of 2,3-epoxypropanol is about 0.1% to 5% by weight.
3. A method as in claim 1 wherein the composition contains a steroid.
4. A method as in claim 1 wherein the composition contains an antibiotic.
5. A method for cold sterilizing an aqueous injectable pharmaceutical solution in situ which comprises dissolving about 0.1% to 5% of 2,3-epoxypropanol therein and protecting the solution for about one to four weeks from further outside contamination until sterile and thereafter to maintain sterility.

References Cited in the file of this patent

UNITED STATES PATENTS

| 2,890,119 | Minkler et al. | June 9, 1959 |
|---|---|---|
| 3,054,678 | Michener et al. | Sept. 18, 1962 |

OTHER REFERENCES

D. and C. Ind., vol. 54, No. 4, April 1944, p. 408.